(No Model.)
S. C. C. CURRIE.
SYSTEM OF ELECTRICAL DISTRIBUTION.
No. 544,289. Patented Aug. 13, 1895.
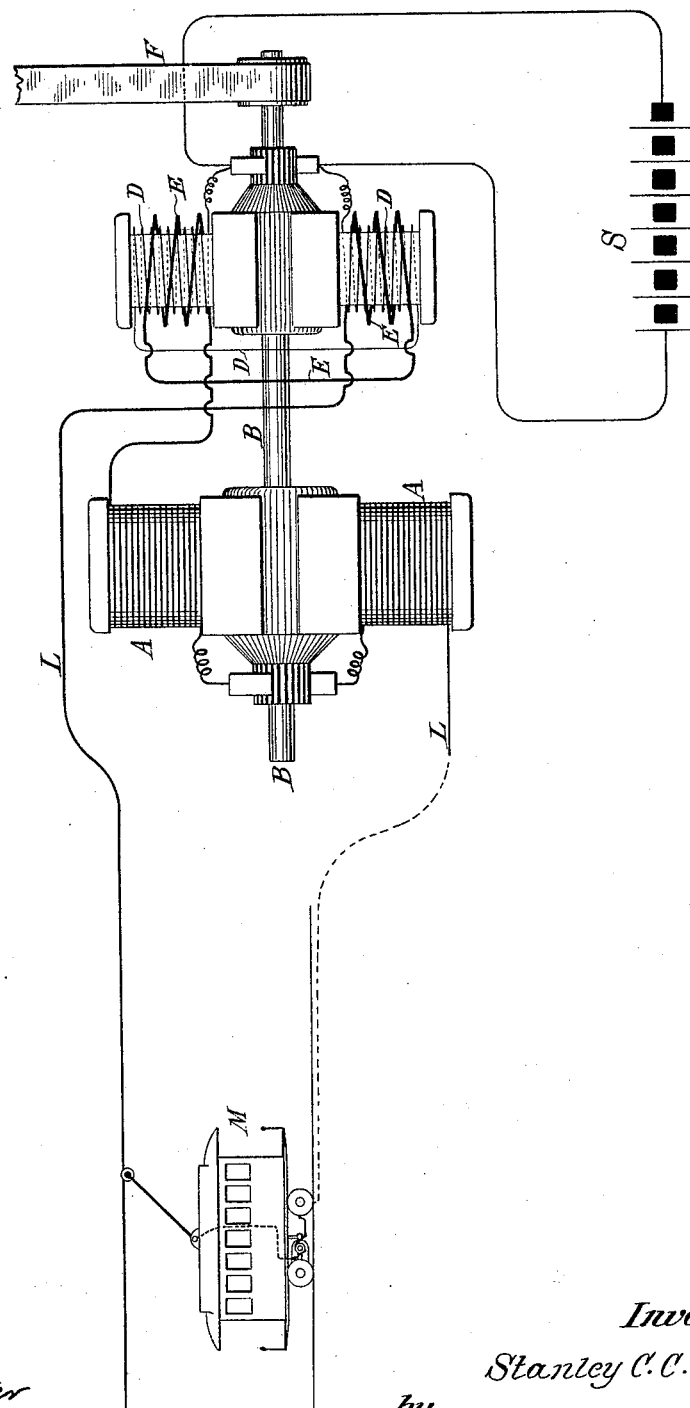
Witnesses:
Raphaël Netter
James N. Catlow
Inventor
Stanley C. C. Currie
by Duncan & Page
Attorneys.

UNITED STATES PATENT OFFICE.

STANLEY C. C. CURRIE, OF NEW YORK, N. Y.

SYSTEM OF ELECTRICAL DISTRIBUTION.

SPECIFICATION forming part of Letters Patent No. 544,289, dated August 13, 1895.

Application filed November 27, 1893. Renewed December 21, 1894. Serial No. 532,517. (No model.)

*To all whom it may concern:*

Be it known that I, STANLEY C. C. CURRIE, a subject of the Queen of Great Britain, residing at New York, in the county of New York and State of New York, have invented certain new and useful Improvements in Systems of Electrical Distribution, of which the following is a specification, reference being had to the drawing accompanying and forming a part of the same.

The general object of this invention is to provide a means whereby a prime motor—such as a steam-engine—which drives one or more electrical generators supplying a system or circuit subject to constant variations in the demand upon it may run with a uniform load. The invention is applicable more particularly to those systems in which the current generated is supplied to a power-circuit in which the number of motors is constantly varying.

In a patent granted to me March 11, 1890, No. 423,029, I have shown a means for accomplishing this object consisting in general terms of two dynamos driven by the same prime motor. One of the dynamos furnishes current to a line; the other charges storage-batteries and excites the field of the first. In the case of such a combination should the load on the line become excessive the generators and engine slow down, and this, reducing the electromotive force of the second or charging machine, permits the storage-batteries to run such machine as a motor, thus assisting the prime motor in driving the supply-generator. Heretofore, also, a similar object has been sought by connecting storage-batteries with the main or working circuit to supplement the dynamo, but under ordinary conditions this would necessitate a battery of very considerable voltage, and increases the tendency to leakage, short-circuiting, and injury to the plates. To obviate this and to secure a better regulation than that which is dependent upon fluctuations in the speed, which it is one object of the system to prevent, I run by the same prime motor two mechanically-connected dynamo electric generators, preferably mounting the two armatures on the same shaft, and use one to supply current to the external circuit, and the other to charge storage batteries which are permanently connected up in its circuit.

The field of the last-named generator is compound wound, the coil of lower magnetizing effect being in the external circuit of the main generator and so proportioned with reference to the coil in the armature-circuit of the second generator that when the normal or mean current is flowing in the external circuit the electromotive force of the second dynamo will be practically equal to that of the batteries in circuit therewith, so that little or no current will be passing either to or from the battery; but on the occurrence of any variation of load on the main generator, resulting in an increase or decrease of the current above or below the normal or mean, there will be a corresponding decrease or increase in the electromotive force of the second generator, whereby it will act either as a motor or as a generator. For example, when the load on the generator is increased above the power of the prime motor the field of the second generator will be so weakened by the increased flow of current that the storage-battery will discharge through it and run it as a motor, supplying the deficiency in power while the excess of load remains on. This I regard as the most convenient and efficient method of carrying out my invention, but it may be modified in any specific detail, provided the electromotive force of the second or supplemental generator be caused to vary inversely as the current on the main or working circuit in such manner that the storage-batteries may come into action as a complement to the prime motor when more power is required than the prime motor is adjusted or adapted to supply.

The invention is illustrated partly in diagram in the accompanying drawing.

A designates the main generator or that which supplies current to the line. On the shaft B, upon which the armature is mounted, there is also mounted the armature C of a second generator having a compound-wound field, one coil D being in shunt to the armature and of fine wire, while the other coil E is of shorter heavier wire and connected up in the main circuit L L of the generator A, the winding being such that the main current has a tendency to demagnetize the field of the second generator.

In the circuit of the second generator is a series of storage-battery cells S of a capacity calculated to meet the requirements of practical working.

The two generators are driven by a suitable prime motor, the driving-belt F only being shown, and the main line L is supposed to supply motors M or other devices in multiple.

In illustration of the operation of the system, suppose the power of the prime motor be maintained at about fifty horse-power, while the load on the generator A varies from double this amount to nothing. When the load on the generator A reaches or is in excess of the limit of the engine, the heavier current on the line lowers the electromotive force of the second machine, so that it becomes a motor and is driven by the battery. On the other hand, when the load is light the electromotive force of the second machine rises and it becomes a generator, charging the battery.

In practice with due observance of proportions it would be fair to assume that the total power required from the battery to the shaft would not exceed twenty-five per cent. of the total power transmitted from the shaft to the line, so that with a daily output of one thousand horse-power hours not more than two hundred and fifty horse-power hours would be required for the battery.

Such a combination necessarily involves a certain loss, both in charging the battery by the generator and in running the motor by the battery; but allowing for such losses and also the small loss by the neutralization of the field of the second generator, there are still many cases where the total saving from being able to maintain a steady load on the prime motor would much more than compensate for the losses named.

What I claim as my invention is—

1. In a system of electrical distribution the method of maintaining a constant load on the prime motor, which consists in driving two mechanically connected dynamos by the prime motor, supplying the main or working circuit by one, charging secondary batteries by the second, and varying the field magnetism of the second by the current of the first whereby the electro-motive force of the second will be varied inversely as the load on the first, and the said second machine driven as a motor by the battery, when the load on the line is excessive, as set forth.

2. The combination with a prime motor of two mechanically connected dynamos driven thereby, a working circuit supplied by one of said dynamos and secondary batteries permanently in circuit with the second, the said second dynamo having a neutralizing field coil connected with the main or working circuit, as herein set forth.

STANLEY C. C. CURRIE.

Witnesses:
 JAMES N. CATLOW,
 SAML. M. HITCHCOCK.